United States Patent [19]

Zupancic et al.

[11] 3,831,188

[45] Aug. 20, 1974

[54] MOUNTING AND DRIVE ASSEMBLY FOR MAGNETIC STRIPE READING HEAD

[75] Inventors: Anton Z. Zupancic, Cleveland; Gary G. See, Chagrin Falls, both of Ohio

[73] Assignee: Addressograph-Multigraph Corporation, Cleveland, Ohio

[22] Filed: May 4, 1973

[21] Appl. No.: 357,431

[52] U.S. Cl........ 360/2, 235/61.11 R, 235/61.11 D, 340/146.3 R, 235/61.7 B

[51] Int. Cl...... G06k 7/08, G06k 13/05, G06k 9/04

[58] Field of Search...235/61.11 D, 61.11 E, 61.7 B, 235/61.11 R, 61.11 B; 340/149 A, 174.1 R, 146.3 R; 179/100.2; 250/219 D; 271/51; 360/2

[56] References Cited

UNITED STATES PATENTS

| | | | |
|---|---|---|---|
| 3,119,020 | 1/1964 | Olson | 250/219 D |
| 3,588,379 | 6/1971 | Young | 235/61.11 D |
| 3,629,556 | 12/1971 | Orzechowski | 235/61.11 B |
| 3,737,884 | 6/1973 | Wallace | 340/174.1 R |
| 3,781,798 | 12/1973 | Hinks | 340/146.3 R |

*Primary Examiner*—Daryl W. Cook
*Assistant Examiner*—Robert M. Kilgore
*Attorney, Agent, or Firm*—Ray S. Pyle

[57] ABSTRACT

The specification and drawings disclose an apparatus particularly suited for reading a magnetically encoded credit card. The apparatus disclosed includes a magnetic reading head aligned with a guideway along which the card is moved. Card movement is provided by a drive roll carried on a first frame mounted for pivoting movement about an axis perpendicular to the path of card movement. A pinch roll is arranged to maintain the credit card engaged with the drive roll. Both the drive roll and the pinch roll have their axes perpendicular to the path of movement. The magnetic reading head is preferably aligned with the axis of the drive roll and located so that as a credit card is conveyed between the drive roll and the pinch roll the magnetic stripe thereon is moved past the reading head. Additionally, the magnetic reading head is carried by a second frame mounted on the first frame for pivotal movement about an axis generally parallel to the intended path of movement of the card. The disclosed drive assembly for the drive roll comprises a synchronous motor mounted on the first frame and having a light-weight pulley carried on its output shaft. A relatively heavy flywheel-pulley assembly is drivingly connected with the drive roll and a resilient belt interconnects the light-weight pulley and the flywheel-pulley assembly.

6 Claims, 3 Drawing Figures

MOUNTING AND DRIVE ASSEMBLY FOR MAGNETIC STRIPE READING HEAD

BACKGROUND OF THE INVENTION

The subject invention is directed toward the art of data reading devices and, more particularly, to an apparatus for reading encoded data on credit cards or the like.

The invention is especially suited for use in reading credit cards of the type having a magnetic stripe and will be described with particular reference thereto; however, the invention is capable of broader application and could be used in optical or piezo-electric card reading systems.

Reading of the magnetic stripe on a credit card requires precise relative movement between the magnetic reading head and the credit card. In addition, the relationship between the magnetic stripe and the reading head must be maintained within close tolerances. The inherent difficulty of maintaining the required relationship between the card and the head is compounded by irregularities in the cards. For example, the cards are sometimes bowed so that the magnetic stripe does not lie in a single plane. Thus, difficulties are often encountered in maintaining the contact between the card stripe and reading head.

SUMMARY OF THE INVENTION

The primary object of the subject invention is the provision of an improved mounting and drive assembly for overcoming the above mentioned difficulties. The assembly preferably comprises a reading head member aligned with a drive roll. The drive roll has its axis of rotation generally perpendicular to the intended path of card movement and is carried by a first frame mounted for pivoting movement about an axis generally perpendicular to the path. The reading head is supported from a second frame mounted on the first frame for pivotal movement about an axis generally parallel to the intended path of card movement. A pinch roll member is mounted in close proximity to the drive roll member for cooperating therewith to maintain the credit card beig read in close driving engagement with the drive roll. A further and more limited aspect of the invention contemplates that the drive roll will be driven at an extremely constant velocity by a drive which preferably includes a relatively heavy pulley and flywheel assembly drivingly connected with the drive roll. A synchronous motor is carried on the first pivotally mounted frame and has a light-weight pulley carried on its output shaft. The light-weight pulley is drivingly connected with the pulley-flywheel assembly through a resilient, elastic belt which, in the preferred embodiment, is preferably a round, elastomeric O-ring.

By mounting the reading head in alignment with the drive roll and having the drive roll carried on a pivotally mounted frame, the reading head is maintained constantly oriented relative to the card which is, of course, gripped between the drive roll and the pinch roll. Variations in card thickness or configuration do not materially affect the relationship between the reading head and the magnetic stripe since the drive roll shifts to compensate for card variations.

Preferably, and in accordance with a more limited aspect of the invention, the reading head is aligned with the axis of both the drive and pinch rolls. This assures that the magnetic head is always at a location on the card which is properly located relative to the drive and pinch rolls and thus is not substantially shifted due to card bow or thickness variations. Moreover, since the reading head can pivot independently of the first or drive roll supporting frame, the force with which the head engages the card can be separately controlled.

The drive assembly comprising the light-weight pulley and the relatively heavy pulley-flywheel interconnected by the elastic belt serves to provide a particularly constant output speed at the drive roll. Upon start-up of the synchronous motor the belt stretches. The pulley-flywheel then catches up to full synchronous speed a fraction of a second later. Also, the elastic belt and pulley-flywheel serve to dampen out vibration from the motor pulley.

As is apparent from the foregoing, the overall arrangement of the apparatus is relatively simple. Moreover, because of the noted features, the apparatus is reliable and easy to construct and operate.

Accordingly, a primary object of the invention is the provision of a card reading apparatus which is simple and reliable.

Another object is the provision of a card reading apparatus wherein a reading head and a card drive roller are mounted on a common, pivotal frame with the reading head being pivotally mounted on the common frame.

The above and other objects and advantages will become apparent from the following description when read in conjunction with the accompanying drawings.

IN THE DRAWINGS

DESCRIPTION OF THE PREFERRED EMBODIMENT

Figure 1:
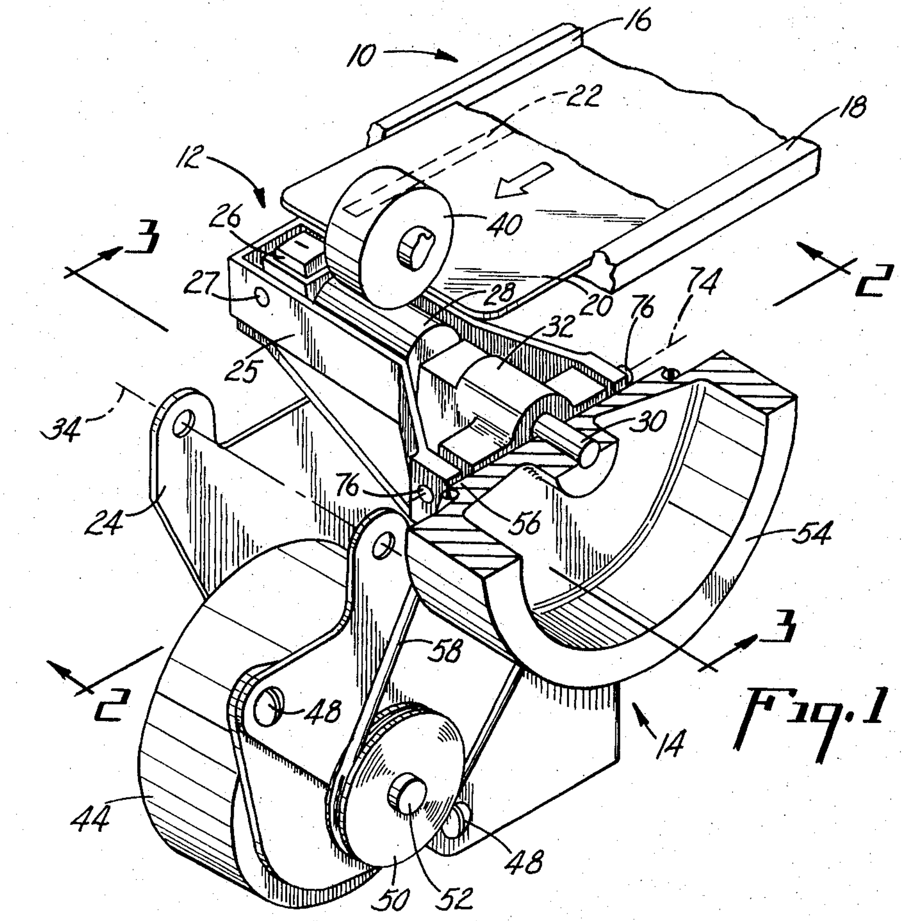
FIG. 1 is a somewhat diagrammatic, pictorial view showing the preferred arrangement for a card reading apparatus formed in accordance with the subject invention (portions have been broken away to show certain details more clearly)

Referring more particularly to FIG. 1 the overall arrangement of the card reading apparatus is shown as including a first card guideway forming means 10 which is associated with a reading head and drive assembly 12. A drive motor and mounting unit 14 is carried beneath assembly 12.

The card guideway assembly 10 is shown somewhat diagrammatically and includes a pair of spaced guide members including vertically extending surfaces 16 and 18 which serve to engage the opposite lateral edges of the card 20 and guide it for movement past the reading head and drive assembly 12. As shown, the card 20 is adapted to be received between the surfaces 16 and 18 for movement in the direction of the arrow. The magnetic stripe 22 is illustrated schematically by dotted lines in FIG. 1.

It should be understood that the guideway 10 is located so that when the card is placed in the guideway the magnetic stripe 22 is in proper alignment with the magnetic reading head 26.

In the embodiment under consideration, the reading head 26 and drive assembly 12 is mounted beneath the guideway forming means 10. As illustrated, a first support frame 24 extends generally horizontally beneath the guideway forming means 10. The reading head 26 of relatively conventional design is carried at the end of a second frame 25 supported by the first frame 24. Head 26 is supported in the end of frame 25 in a manner which permits it to have limited tilting movement about an axis parallel to the path of movement of the card. For example, pivoting point 27, consisting of the steel pins extending from opposite surfaces of the magnetic head 26 and extending into the frame 25, are used to allow a magnetic head 26 to maintain contact with the card 20 to follow any angular variations of the card, and to accommodate change in attitude of the frame 25 due to any thickness variation between cards.

Figure 2:
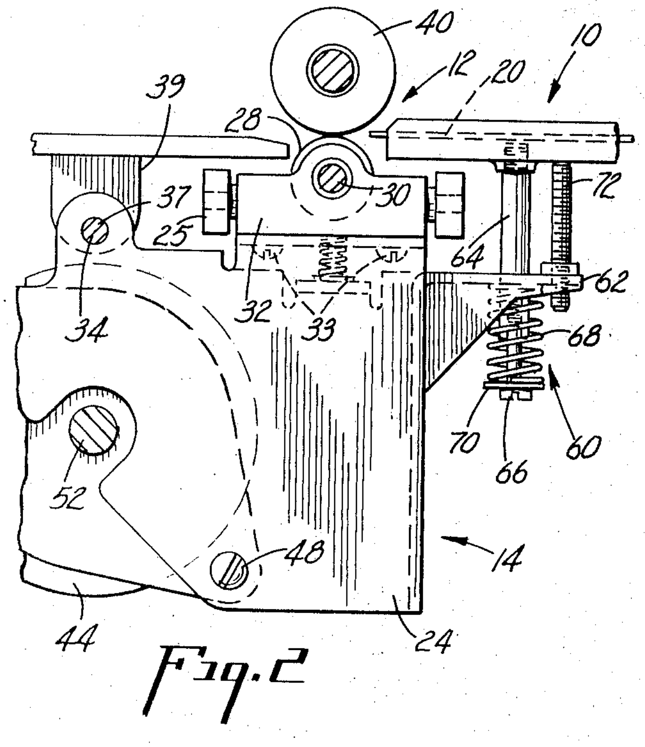
FIG. 2 is a side elevation taken on line 2—2 of FIG. 1.

Card 20 is conveyed past the reading head 26 by a friction drive roller 28. Drive roller 28 is preferably provided with an outer surface formed from a resilient material having good friction characteristics. In the embodiment under consideration, drive roller 28 is positioned with its axis of rotation generally aligned with the magnetic reading head 26 and perpendicular to the path of movement of the card. As shown, roller 28 is carried at the outer end of a shaft 30 which extends through a support or bearing block 32. Bearing block 32 is directly connected to frame 24 such as by screws 33 (see FIGS. 2 and 3).

At this point it should be noted that the first frame 24 is mounted for pivotal movement about an axis 34 which extends parallel to the axis of rotation of friction roller 28. The axis 34 is defined by a shaft 37 which extends through frame 24 and is supported from a downwardly extending bracket 39 (see FIG. 2) which is carried from associated frame structure not illustrated.

As can be appreciated from the foregoing, frame 24, as well as drive roller 28 and reading head 26, can all pivot substantially as a unit about a line perpendicular to the intended path of card movement. Additionally, it should be noted that the axis 34 is located a substantial distance from the axis of roller 28.

In order to maintain frame 24 continually biased in a counterclockwise direction (as viewed in FIG. 2) a biasing spring assembly 60 is connected with the right-hand end of frame 24. As shown, a bracket 62 extends outwardly about a shaft 64 carried from the card guideway forming means 10. Shaft 64 passes freely through the bracket 62 and a washer 70 carried by screw 66. In order to limit the total swing of the frame 25, an adjustable stop screw 72 extends upwardly from bracket 62 for engagement with the underside of guideway forming means 10. This arrangement permits adjustment of the pressure of engagement between the friction roller 28 and a card 20.

Associated with the friction of drive roller 28 and mounted to cooperate therewith is a pinch roll 40. Pinch roll 40 is carried by suitable frame structure (not shown) and arranged so as to maintain the card 20 generally planar relative to the guideway 10. That is, if the card is bowed across its width the pinch roll 40 will deflect it downwardly into proper engagement with the friction drive roller 28. Thus, any longitudinal bend in the card does not affect the relationship between the magnetic stripe and the magnetic reading head since they are in alignment in the manner shown. It should also be noted that the top surfaces of roller 28 and reading head 26 are normally generally in alignment.

Figure 3:
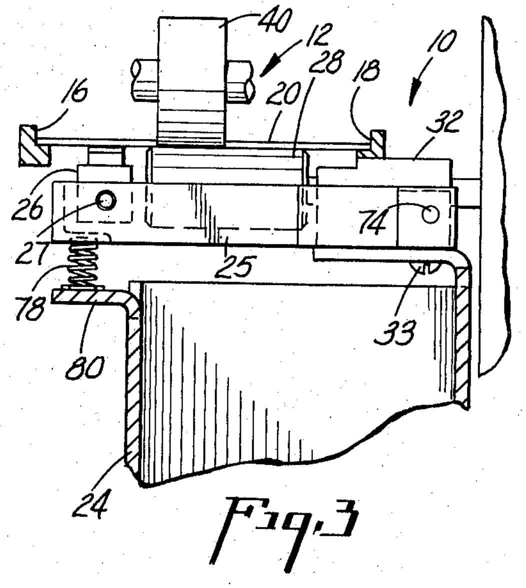
FIG. 3 is a cross-sectional view taken on line 3—3 of FIG. 1.

An important feature of the mounting of the reading head 26 is best seen in FIGS. 1 and 3. As shown, the second frame 25 is mounted for limited pivoting movement about an axis 74. Axis 74 is defined by stub shafts 76 which extend outwardly from bearing block 32. Frame 25 is maintained under a continuous upward bias by a relatively light compression spring 78 which is positioned between a bracket 80 carried on frame 24 and the underside of the outer end of frame 25. This arrangement permits the force of contact between the magnetic reading head 26 and a card 20 to be maintained at a predetermined level. Moreover, the arrangement allows minute shifting of the head to compensate for card and/or magnetic stripe variations.

Although different means could be used for driving the friction roller 28, in the preferred embodiment the drive means take the form of a synchronous motor 44 suitably supported from frame 24. As previously discussed, frame 24 is mounted for pivotal movement about axis 34 which is generally parallel to the axis of the friction roller 28. The motor 44 is suitably connected to the frame 24 in any convenient manner such as through the use of a pair of screws 48. The connection between the synchronous motor 44 and the friction roller 28 includes a first, light-weight pulley 50 which is positively connected to the output shaft 52 of the motor 44. A relatively heavy, pulley-flywheel assembly 54 is similarly connected to the shaft 30. Pulley-flywheel assembly 54 has substantial mass relative to the pulley 50. Additionally, it should be noted that the pulley portion 56 of assembly 54 is aligned with the light-weight pulley 50. A resilient, round, elastic belt 58 extends about the pulley and flywheel and drivingly interconnects them.

Although not shown in the drawings, it should be understood that various electrical interconnections would be provided between the magnetic head 26 and associated read-out devices. Moreover, suitable power connections and the usual start-stop switches would be provided for motor 44.

The invention has been described in great detail sufficient to enable one of ordinary skill in the art to make and use the same. Obviously, modifications and alterations of the preferred embodiment will occur to others upon a reading and understanding of the specification and it is out intention to include all such modifications and alterations as part of our invention insofar as they come within the scope of the appended claims.

What is claimed is:

1. An apparatus for reading data encoded on a credit card or the like, wherein means are provided for guiding an encoded card along a path and wherein a friction drive roll and a pinch roll cooperate to drive a card along the path, the improvement in mounting a read head for continuous alignment with a magnetic stripe portion of a card to be read, comprising:

a support frame;

said friction drive roll supported by said frame;

a pivot mounting supporting said frame with the friction drive roll therein for pivotal movement in a path perpendicular to said card path;

said read head carried on said frame and mounted for limited pivotal movement about an axis parallel to said card path;

a drive motor connected with the pivotally mounted friction drive roll; and a pinch roll separate from said support frame mounted in close proximity to the friction drive roll for maintaining a card being read in close driving engagement with the friction drive roller.

2. The apparatus as defined in claim 1 wherein said read head is aligned with the axis of said friction drive roll.

3. The apparatus as defined in claim 1 wherein said read head comprises a magnetic reading head.

4. The apparatus as defined in claim 1 wherein said friction roll and said read head are generally aligned and wherein the axis of said friction roll is parallel to the axis of said pinch roll.

5. The apparatus as defined in claim 1 wherein said friction roll and said read head are mounted subjacent to said pinch roll.

6. Apparatus for reading data encoded on a credit card or the like comprising:

means for guiding an encoded card along a path;

reading head means carried on a support frame and mounted for limited shifting movement about an axis parallel to said path;

friction roller means having its axis of rotation extending generally perpendicular to the path and carried by a frame mounted for pivoting movement about an axis extending perpendicular to said path, said friction roller means being adapted to engage an encoded card and convey it past said reading head means, said reading head means and said friction roller means being generally aligned; and, pinch roll means mounted in close proximity to the friction roller means for maintaining the card being read in close driving engagement with the friction roller means, the axis of said pinch roll means and the axis of said friction roller means lying in a common plane which passes generally through said reading head means.

* * * * *